United States Patent

[11] 3,610,606

| [72] | Inventor | Gary E. Andrews<br>5199 Priorbrook, Florissant, Mo. 63033 |
|---|---|---|
| [21] | Appl. No. | 864,743 |
| [22] | Filed | Oct. 8, 1969 |
| [45] | Patented | Oct. 5, 1971 |

[54] TURNBUCKLE AND SHOCK ABSORBER
8 Claims, 3 Drawing Figs.

[52] U.S. Cl. .................................................. 267/74,
267/162
[51] Int. Cl. ..................................................... F16f 13/00
[50] Field of Search .......................................... 267/162,
71, 72, 74

[56] References Cited
UNITED STATES PATENTS
3,462,137  8/1969  Grube ........................ 267/74
FOREIGN PATENTS
187,788  2/1964  Sweden ...................... 267/162
612,082  3/1935  Germany ..................... 267/162

Primary Examiner—James B. Marbert
Attorney—Cohn & Powell

ABSTRACT: The turnbuckle includes a housing and a compound plunger receivable by the housing and having threadedly adjustable head and body portions. Cable attachments are provided at each end of the turnbuckle. The housing includes spaced abutments and the plunger is preloaded by means of a compression spring extending between the underside of the plunger head and one of the abutments. Clutch action between the other abutment and the plunger head rotates the housing and the plunger head together until a rated load is reached. Further rotation disengages the clutch and precludes additional tensioning of the cable system. Residual compression in the springs accommodates shock loading, and thrust bearings are provided under spring and at one cable attachment point to preclude rotational binding of the device.

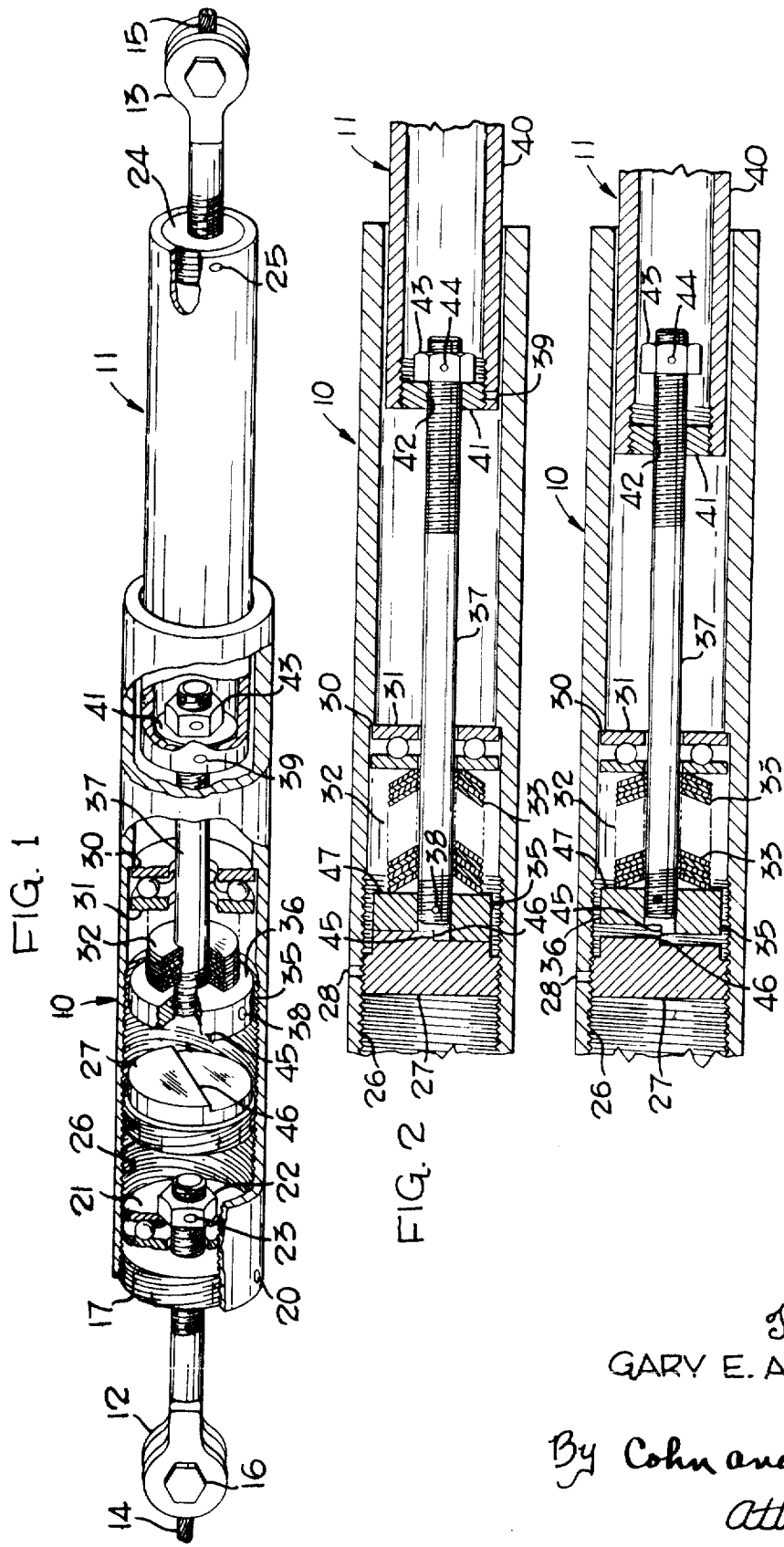

3,610,606

TURNBUCKLE AND SHOCK ABSORBER

BACKGROUND OF THE INVENTION

This invention relates in general to turnbuckles and in particular to a shock-absorbing turnbuckle capable of inducing a specific load into a stressed system.

Turnbuckles providing a coupling for use between lengths of rod and wire and consisting of a metal loop or sleeve with opposite internal threads at each end, or with an internal thread at one end and a swivel at the other end have been in use for many years. Such basic forms of turnbuckles provide a means of increasing or decreasing the effective length of a rod or cable by turning the loop independently of the attached rods or cables. This type of turnbuckle is adequate when a simple tensioning of the coupled members is required. It is totally inadequate, however, when the coupled members are required to be tensioned a specific amount. In addition, such turnbuckles make no provision for transmitting temporary shock loading.

Variations from the common turnbuckle have appeared from time to time but there is no indication that these have been generally successful particularly for holding down machinery and other forms of equipment during transportation. No adequate turnbuckle is available which combines a rated tensioning capability with a shock-loading capability.

SUMMARY OF THE INVENTION

This turnbuckle permits loading of a cable, rod, chain or other system to a given rate and no more. It cannot be inadvertently overloaded. The rated loading of the turnbuckle may be adjusted by simply substituting or augmenting a preloading spring element.

The device effectively absorbs overload and thereby eliminates the need for manufacturing to an excessively high safety factor each component of the system in which it is used. The turnbuckle is substantially free of external projections and is particularly useful for tying down equipment for transportation. It is also most useful for preloading systems susceptible to shock loads.

The turnbuckle includes an elongate housing having a plunger means mounted within. The housing and the plunger means are each connected to an associated attachment means which is, in turn, connected to a loadable element, such as a cable.

An engagement means is provided within the housing which includes first and second abutment portions disposed in spaced relation longitudinally of the housing.

The plunger means includes threadedly related first and second plunger members, and clutch means is disposed between the first plunger member and one of said abutment portions. Resilient means is disposed between the first plunger member and the other of said abutment means.

The housing and the first plunger member are mutually rotatable relative to the second plunger member when the clutch members are in engagement under a first-loading condition. The first and second plunger members are mutually rotatable relative to the housing when the clutch elements are disengaged under a second-loading condition.

The resilient means includes a preloaded spring which determined the disengagement of the clutch means.

A pair of thrust bearings facilitates the transfer of load from the loadable elements to the housing when the housing and plunger means are relatively rotated. One of the thrust bearings is disposed adjacent the second abutment means and carries the spring load. The other of said thrust bearings is part of one of the attachment means.

The first plunger member includes a head having an elongate member which forms the second plunger member. The second abutment means includes an aperture receiving the elongate stem and the resilient means includes a compression member formed from a plurality of stacked annular tapered washers substantially concentrically disposed about the stem.

The housing is internally threaded and one of said abutment means is threadedly adjustable within said housing to selectively determine the precompressed length of the stacked washers whereby to determine the degree of preloading therein.

BRIEF DESCRIPTION OF THE DRAWING

FIG. 1 is a perspective view of the turnbuckle partly cut away to indicate the constituent parts thereof;

FIG. 2 is an enlarged fragmentary sectional elevation taken longitudinally of the turnbuckle and illustrating the disposition of parts when the turnbuckle is loaded below the rated valve;

FIG. 3 is a similar sectional elevational view illustrating the disposition of parts when the turnbuckle is loaded to the rated valve.

DESCRIPTION OF THE PREFERRED EMBODIMENT

Referring now by characters of reference to the drawing and first to FIG. 1, it will be understood that the turnbuckle includes an elongate tubular housing 10 and a compound plunger 11 constituting an adjustable plunger means telescopically received by the housing. The turnbuckle includes eyebolts 12 and 13 at each end, each eyebolt being connected to either the housing 10 or the plunger 11 and providing a connection between cables 14 and 15 and the associated turnbuckle element to which these cables are attached. The cables 14 and 15 constitute loadable elements.

Specifically, the cable 14 is attached to the eyebolt 12 by means of a fastener 16, and the eyebolt 12 is freely received into the central aperture of an end cap 17, the end cap 17 being threadedly received by the housing 10 and fixed in position by means of a setscrew 20. A thrust bearing 21, adjacent the end cap 17, is held in place against the end cap 17 by means of a nut 22 fixedly located on the shank of the eyebolt 12 by means of a setscrew 23. The eyebolt 13 is threadedly attached to an end cap 24, held in position by setscrew 25, by a locked nut (not shown). A thrust bearing is not required at this end.

The housing 10 includes an internally threaded portion 26 into which the end cap 17 is received. The threaded portion extends a substantial distance within the housing and provides the means by which an adjustable threaded plug 27 may be moved longitudinally within the housing 10. It will be understood that the plug 27 is shown out of position in FIG. 1 for illustrative purposes. The interior of the housing 10 includes a stepped-shoulder portion 30 providing a seat for a thrust bearing 31, and the thrust bearing 31 together with the stepped-shoulder portion 30 provides an abutment means against which a spring 32 may bear. The spring 32 constitutes a resilient compression element and, in the preferred embodiment, is formed from a plurality of stacked conical washers 33 (see FIGS. 2 and 3) to form a belleville spring which is to be preloaded in a manner later to be described.

The compound plunger 11 consists essentially of a first head member, having an enlarged end 36 and an elongated stem 37 locked thereto as by setscrew 38, and a second tubular body member 40. The tubular body member 40 includes an annular plug 41 threadedly received within the inner end of the body member 40 and fixed in position by setscrew 39. The plug 41 includes a threaded aperture 42 threadedly receiving the elongate stem 37 in adjustable relation thereto. At its remote end, the elongate stem 37 includes a nut 43 fixedly attached thereto as by setscrew 44.

It will be observed from FIGS. 2 and 3 that the adjustable plug 27 is fixedly positioned by means of a setscrew 28. The plug 27 constitutes a first abutment means, and the thrust bearing 31 seated on the shoulder 30 constitutes a second abutment means. These two abutment means provide a pair of spaced engagement portions constituting an engagement means.

The remote face of the head member 35 of the plunger 11 includes a step 45 constituting a clutch element which is interengageable with a similar step 46 on the plug 27 The interengageable clutch elements provide a clutch means between the plunger head 35 and the plug 27, the plug 27 and the thrust bearing 31 in their fixed positions becoming, in effect, part of the housing 10. The underface 47 of the enlarged end 36 constitutes a shoulder portion and provides a bearing for one end of the spring 32. The other end of the spring 32 is, as previously noted, supported by the thrust bearing 31 which transfers load to the stepped-shoulder 30.

With the plug 27 in position, the spacing between the underside of the plunger end 36 and the thrust bearing 31 is such as to provide precompression in the spring 32. Thus, when there is no external axial load on the turnbuckle, the spring 32 urges the enlarged end 36 of the plunger 11 into clutch relation with the plug 27. The clutch becomes disengaged when the turnbuckle is subjected to an external load sufficiently great to overcome the preload in the spring and disengagement of the clutch occurs. At this point, the spring is not bottomed out and consequently possesses residual resilience sufficient to accommodate shock loads on the loaded cables 14 and 15. During clutch engagement, the housing 10 and the plunger head 35 rotate together relative to the plunger body 40. After disengagement, the housing 10 rotates freely and independently of both plunger members which are relatively stationary.

It is thought that the structural features and functional advantages of this shock-absorbing turnbuckle have become fully apparent from the foregoing description of parts, but for completeness of disclosure, the installation and operation of the turnbuckle will be briefly described.

The compound plunger 11 may be preassembled with the thrust bearing 31 and the belleville spring washer unit 32 disposed about the stem 37. The plunger 11 may then be fed into the housing 10 until the thrust bearing 31 engages the stepped shoulder 30. At this time, the spring 32 is unstressed. To achieve the requisite, predetermined preload in the spring 32, the plug 27 is simply threaded into the housing 10 until the clutch step 46 engages the compatible clutch step 45 on the plunger head 35. Further rotation of the plug 27 urges the plunger head 35 toward the thrust bearing 31 and, because the spring 32 is disposed between the head 35 and the thrust bearing 31, this rotation compresses the spring 32. The properties of the spring 32 are known and the longitudinal movement of the plug 27 can be easily determined from a consideration of the internal threads per inch of the housing 10. The amount of precompression induced in the spring 32 may therefore be accurately determined. It will be understood that the amount of precompression may also be determined by applying a gradually increasing test load because clutch disengagement will occur when the turnbuckle is subjected to a load in excess of the precompression load. In any event, when the desired precompression is achieved, the setscrew 28 is tightened to fix the plug 27 in position.

For the sake of an example, it will be assumed that the cable members 14 and 15 are to be tensioned to a load of 2,000 pounds. Before installation in the cable line, this disposition of parts in the turnbuckle will be as indicated in FIG. 2. That is to say, the spring 32 will be under compression induced as described above, the compression being less than 2,000 pounds. After installation in the line, the housing 10 is rotated relative to the plunger 11. Because of the clutch action between the plug 27 and the plunger head member 35, the elongate stem 37 is threaded into the plug 41 of the tubular body 40 of the plunger 11. The thrust bearings 21 and 31 ensure that relative rotation of the housing 10 and the plunger 11 may take place with a minimum of frictional resistance, and importantly, without rotation of the cables 14 and 15.

It will be understood that the threading of the elongate stem 37 within the tubular body 40 effectively shortens the overall length of the turnbuckle, thereby inducing tension into the cables 14 and 15. When due to continued rotation, the tension in the cables 14 and 15 reaches the precompression value of the spring 32, there is a tendency for the clutch faces to disengage. When induced tension load in the cables 14 and 15 achieves the value of the precompression in the spring 32, the spring 32 shortens proportionately to the amount of load in excess of the precompression. When the excess load is sufficient to cause the spring to deflect an amount equal to the height of the step 45 and the clutch therefore becomes disengaged, the plug 27 and the housing 10 will rotate independently of the plunger 11 and will therefore induce no further load into the cable system. At this point, the turnbuckle will be loaded in excess of the precompression originally in the spring 32 and, of course, the height of the clutch step 45 is so chosen that disengagement occurs at the rated value of the turnbuckle, namely 2,000 pounds in the example.

If, for some reason, the cables 14 and 15 are slackened and the load therein consequently diminishes to a value below that of the spring preload, the clutch elements will once more engage and the turnbuckle may be operated as before to again tension the cables to the rated, required amount.

FIG. 3 illustrates the disposition of parts when the cables 14 and 15 are loaded to the turnbuckle rating and it can be seen at this time, the clutch faces are disengaged. It will be observed that the spring 32 at this time is not completely bottomed out and it is therefore capable of taking a shock load. This shock load is determined by the amount of compression which the spring 32 may take before bottoming out. As a practical matter, a turnbuckle designed for 2,000 pounds rating will have sufficient residual resilience in the spring to cater for a 6,000 pounds shock load. The strength of the turnbuckle as a whole after bottoming out of the spring depends on the strength of the individual components, for example, the stem 37. Generally speaking, the breaking strength of such elements is of the order of 15,000 pounds in a turnbuckle catering for a shock load of 6,000 pounds and this provides a considerable and desirable factor of safety.

I claim as my invention:
1. A shock-absorbing turnbuckle comprising:
   a. an elongate housing means including engagement means,
   b. first attachment means adapted to attach the housing to a loadable element,
   c. an adjustable plunger means received by the housing, and including first and second threadedly related members,
   d. second attachment means adapted to attach the second plunger member to another loadable element,
   e. clutch means between the first plunger member and the engagement means including selectively operatively interengaging clutch elements, one of said elements being fixedly carried by the first plunger member and the other of said elements being fixedly carried by the engagement means, whereby the housing and first plunger member are rotatable relative to the second plunger member when said clutch elements are in engagement under a first loading condition, and the first and second plunger members are rotatable relative to the housing when the clutch elements are disengaged under a second loading condition, and
   f. resilient means operatively engaging the plunger means and the engagement means.
2. A turnbuckle as defined in claim 1, in which:
   g. the resilient means includes a compression spring, and
   h. the engagement means includes a thrust bearing operatively engageable by the spring to transfer load from the first plunger member to the housing.
3. A turnbuckle as defined in claim 1, in which:
   g. the engagement means includes first and second engagement portions disposed in spaced relation longitudinally in the housing means,
   h. the clutch element of the engagement means is carried by the first engagement portion,
   i. the resilient means is disposed between the first plunger member and the second engagement portion,
   j. the second engagement portion includes a first thrust bearing transferring load from the plunger means to the housing, and k. one of the attachment means includes a second thrust bearing adapted to transfer load from one of the loadable elements to the turnbuckle.

4. A shock-absorbing turnbuckle, comprising:
   a. an elongate tubular housing including first and second abutment means disposed in spaced longitudinal relation within the housing,
   b. first attachment means connected to the housing and adapted to attach the housing to a loadable element,
   c. adjustable plunger means mounted within the housing and including threadedly related head and body members selectively changing the length of the plunger means,
   d. second attachment means connected to the plunger means and adapted to attach the plunger means to another loadable element,
   e. clutch means between the plunger head member and the first abutment means whereby the housing and the plunger head member are rotatable relative to the plunger body member when the clutch means is engaged and the plunger body and head members are rotatable relative to the housing when the clutch means is disengaged, and
   f. a resilient compression element extending between the plunger head member and the second abutment means.

5. A turnbuckle as defined in claim 4, in which:
   g. the clutch means includes selectively operatively interengaging clutch elements, one of the elements being fixedly carried by the plunger head member and the other of said elements being fixedly carried by the first abutment means,
   h. the head member includes shoulder means,
   i. the compression element extends between said shoulder means and the second abutment means.

6. A turnbuckle as defined in claim 4, in which:
   g. the first attachment means is connected to the housing in nonextensible relation,
   h. the second abutment means includes a first thrust bearing transferring load from the compression element to the housing,
   i. one of the attachment means includes a second thrust bearing adapted to transfer load from one of the loadable elements to the turnbuckle.

7. A turnbuckle as defined in claim 4, in which:
   g. the head member of the plunger means includes:
      1. a remote face portion,
      2. an elongate stem portion,
      3. a shoulder portion spaced from said face portion,
   h. the first abutment means in the housing includes a bearing face portion,
   i. the clutch means includes selectively operatively interengaging clutch elements, one of said elements being disposed on the remote face portion of the plunger head member and the other of said elements being disposed on the bearing face portion of the first abutment means,
   j. the second abutment means in the housing includes a first thrust bearing having an aperture receiving the elongate stem portion of the head member,
   k. The resilient compression element extends between the shoulder portion of the plunger head member and the first thrust bearing,
   l. the housing is internally threaded,
   m. one of said abutment means is threadedly adjustable within said housing to selectively predetermine the length of the compression element, and
   n. the first attachment means includes a second thrust bearing adapted to transfer load from its associated loadable element to the housing.

8. A turnbuckle as defined in claim 7, in which:
   o. the plunger body member includes a tubular element threadedly receiving said elongate stem portion of the plunger head member, and
   p. The compression element includes a plurality of stacked annular tapered washers substantially concentrically disposed about said elongate stem portion and the compression element is selectively preloaded by adjustment of the adjustable abutment means and retains residual resilience when the clutch means is disengaged.